United States Patent [19]
Carder

[11] Patent Number: 6,018,879
[45] Date of Patent: Feb. 1, 2000

[54] VEHICULAR WHEEL ALIGNMENT TOOL

[76] Inventor: Perry M. Carder, 380 Ben Dou Dr., Marion, Iowa 52302

[21] Appl. No.: 08/676,649

[22] Filed: Jul. 8, 1996

[51] Int. Cl.$^7$ ..................................................... G01B 5/14
[52] U.S. Cl. ........................................... 33/203.18; 33/203
[58] Field of Search ................................ 33/203.18, 203, 33/203.19, 203.2, 203.21

[56] References Cited

U.S. PATENT DOCUMENTS

| | | | |
|---|---|---|---|
| 4,407,073 | 10/1983 | Nilsson et al. | 33/203.18 |
| 4,453,315 | 6/1984 | Mosiman et al. | 33/203.18 |
| 4,953,307 | 9/1990 | Loucas | 33/203 |
| 5,339,508 | 8/1994 | Ventress | 33/203.18 |

OTHER PUBLICATIONS

GM Service Manual Camber Adjustment Tool J 29862 (Date Unknown).

*Primary Examiner*—Christopher W. Fulton
*Attorney, Agent, or Firm*—Allan L. Harms

[57] ABSTRACT

Apparatus for use in setting the specified camber angle in the alignment of automobile, sport utility vehicle and small truck wheels mounted on combination strut/spring suspensions, independent suspensions equipped with non-accessible modified two bolt slotted struts, or independent suspensions equipped with accessible modified two bolt slotted struts. A bar is affixed to the wheel to be aligned which bar extends above the wheel. Through the top portion of the bar is passed top adjustment assembly which affixes to the spring, strut or strut housing and is moved inwardly or outwardly after the wheel assembly attached to the strut has been loosened thereby establishing the proper camber angle of the wheel and retaining the wheel in the appropriate orientation until the mechanic tightens the wheel restraining bolts or assembly of the strut.

19 Claims, 7 Drawing Sheets

VEHICULAR WHEEL ALIGNMENT TOOL

BACKGROUND OF THE INVENTION

This invention referred to as the Vehicular wheel alignment tool, consists of a tool to aid in the adjustment of the camber alignment of automobile, sport utility vehicle or light truck wheels undergoing the mechanical wheel alignment procedure. By use of one of the three attachments, this tool is designed for use in the alignment of all wheels mounted on a combination strut/spring design suspension or a modified strut/spring design suspension.

The alignment of a vehicular wheel is a labor intensive process. After a String Alignment machine or a Laser Alignment machine is attached to the wheels of the vehicle, the wheel must be manually adjusted so as to attain the required alignment angles. A key alignment setting that must be achieved in this process is establishing the proper camber of the wheel. Camber is the angle of the inward or outward tilt of the wheel in comparison to the true vertical axis.

In the process of setting the proper camber alignment, it has been a general practice in the automotive industry to utilize two persons. This alignment setting is accomplished by loosening the upper and lower camber bolts and manually maneuvering the wheel to attain the correct camber alignment angle. Once the proper camber angle is achieved, the wheel is secured in that orientation by tightening the retaining nuts on the upper and lower camber bolts. This process is normally accomplished through the initial steps by one mechanic. In order to secure the wheel in the proper camber angle, however, the first mechanic is required to physically restrain the wheel assembly to keep it from shifting while a second mechanic tightened the upper and lower camber bolts.

This customarily employed camber alignment procedure was disadvantaged in two ways. First, this procedure required two persons to accomplish the camber setting. Secondly, it was further disadvantaged by the frequency of the wheel slipping out of the specified range due to the inability of the second mechanic to securely restrain the wheel in place as the camber bolts were tightened.

In setting camber alignment, a vehicle manufacturer may specify a range of 0°+/−½°. Accordingly, as a result of vibrations and/or unintended movement by the mechanics, on many occasions the wheel slips out of the specified camber range during the process of tightening the camber bolts. This event requires the mechanics to repeat the adjustment procedure to reestablish a camber setting of the wheel within the specified range.

Wheel alignments may be performed on vehicles positioned in two different manners. A "lowered wheel position" alignment is performed on vehicles positioned on an alignment rack with the full weight of the vehicle resting upon the tires and suspension. A "raised wheel position" alignment is performed on vehicles positioned upon and elevated by a hoist which results in weight of the vehicle being removed from the tires and suspension. Many mechanics prefer the raised wheel position method due to the ease of access to the camber bolts, reduced effort required, and increase of room in which to perform this procedure. This invention may be utilized in alignments performed on vehicles in the raised wheel position only.

The front end of automotive vehicles have differing configurations. Around 1980, vehicle manufactures began to utilize a combination strut/spring suspension which was customarily referred to as a "MacPhereson Strut Suspension". Additionally, at this point in time vehicle manufacturers began to utilize a rear suspension design which employed a modified strut in conjunction with an independent suspension. This invention is for use in aligning wheels mounted on either the strut/spring suspension or the modified strut suspension which utilize 2 bolt slotted strut mounts.

Equipment to assist in the setting of the camber adjustment during the alignment process of automobiles, sport utility vehicles and light trucks is limited. It is known in the industry that a camber bolt replacement kit is available for use in establishing appropriate camber alignment of the wheel mounted by means of the two bolt slotted strut mount. The camber bolt kit consists of replacement lower camber bolts, each having eccentric washers which operate to move the steering knuckle of the wheel in an inward or outward direction as the bolt is rotated within the lower camber bolt hole. The lower camber bolt hole located in the base of the strut is slotted in configuration. In order to utilize this camber bolt kit, the consumer is charged for the kit which replaces the original equipment manufacturer's (OEM) camber bolts. Additional time is required to install the bolts from this kit. Finally, some dealerships and other automotive alignment businesses prohibit their personnel from utilizing the camber bolt kit for a number of reasons which include cost, potential invalidation of new car warranties, concerns about the structural durability of the replacement bolts, and/or a general policy prohibiting use of other than original equipment manufacturer's equipment.

In addition to the camber bolt replacement kits, there is available to the industry a General Motors Alignment Assist Tool. Its use is limited to vehicles having combination strut/spring suspension with a two bolt slotted strut mount. Unlike this invention which affixes to the wheel and the strut, the GM Alignment Assist Tool is wedged in place between the strut and the inner sidewall of the tire which is mounted on the wheel undergoing alignment. By virtue of this positioning while in use, this tool is less accurate than the invention in that it allows some movement or play in the retention of the wheel resulting from tire flex and the weight of the vehicle. Further, this assist tool can only be used in an alignment wherein the vehicle is in the lowered wheel position.

Another camber alignment tool is known to exist and is referenced in §3A of the GM Service Manuals as a Camber Adjust Tool J-298862. Unlike the invention, the use of this tool is very limited due primarily to the time consuming procedures required for its utilization. In order to utilize this tool, the vehicle must be elevated on a hoist. A mechanic is required to remove the tire and wheel undergoing alignment. Thereafter, the upper and lower camber bolts are loosened and the tool is hooked around the lower camber bolt. By use of a wrench, the mechanic then turns a threaded adjustment rod passing through the tool which pushes against the strut and operates to move the lower camber bolt within the slot.

Finally, an apparatus exists for the permanent bending of wheel axles of heavy truck (tractor-trailer units) and heavy trailers (trailers with straight axles and trailers with trailing arm axles). This device is utilized primarily in collision repair work where the axle of the heavy truck or heavy trailer has been damaged or otherwise bent out of proper alignment. As such, this axle bending apparatus is dissimilar to the invention in this application in both function and use. The axle bending apparatus utilizes extreme hydraulic force that is directed so as to bend the axle on which the wheel is mounted. This device is directly attached to the hub of the wheel, not the wheel itself. When the directed force is applied in the desired direction, the hub is plastically bent so as to alter its alignment to the suspension to which the wheel is connected. This apparatus is embodied in U.S. Pat. No. 5,339,508.

The current means of camber adjustment in the alignment process of automobiles, sport vehicles and light trucks, either by use of two persons or utilizing one of the assist devices known to the industry, are very time consuming and subject to less precision than desired by mechanics. Further, the replacement bolt kit presents an additional expense to the consumer and its use is prohibited by certain dealerships and alignment facilities. Accordingly, there exists a need for improved efficiency and a need for an improved means of establishing and maintaining within the specification range the camber setting of the wheels during the wheel alignment process.

SUMMARY OF THE INVENTION

The alignment tool includes an elongate bar having at least two J-hooks mounted thereto for retaining said bar to a wheel to be aligned. The bar is provided with an opening on its upper end which receives a strut connecting assembly, the strut connecting assembly having a handle section, a center union section and a vehicle engagement mechanism. The handle section passes through the opening of the bar. In the preferred embodiment, the vehicle engaging system comprises a clamp for selective attachment to a coil of the vehicle support spring associated with the wheel to be aligned. In an alternative embodiment useful to adjust the camber of a rear wheel, the vehicle engagement mechanism comprises a transverse bracket having opposing ends with spaced apart fingers to receive opposing spaced apart pinch welds on the vehicle. In a third embodiment, the vehicle engagement mechanism comprises an adjustable clamp which may grasp a vertical member such as a shock absorber body mounted to the vehicle.

The present invention satisfies both of these needs. The Vehicular wheel alignment tool is easily and quickly installed on any wheel and the strut of the vehicle. Once the camber bolts are loosened, the alignment mechanic needs only turn the handle of the top adjuster assembly to rotate the tilt of the wheel inward or outward as necessary. This presents the benefit of performing this adjustment so as to precisely move the wheel to an exacting camber alignment position without the aide of a second mechanic. An additional benefit is the ability of the invention to firmly retain the wheel within the specification range while the alignment mechanic tightens the camber bolts. Utilizing this tool allows the alignment mechanic to be more efficient and precise in setting the camber of the wheel representing an overall savings associated with the performance of the vehicular wheel alignment. This speed and accuracy achieved by use of this invention represent the key benefits associated with this invention. In addition to the benefits associated with the use of this invention, this invention may by utilized on a wide variety of vehicles in the alignment of both the front and rear wheels.

Further features will appear as a preferred embodiment of the Vehicular wheel alignment tool is disclosed in detail in the ensuing description and accompanying drawings.

DETAILED DESCRIPTION OF THE PREFERRED EMBODIMENT

Figure 2:
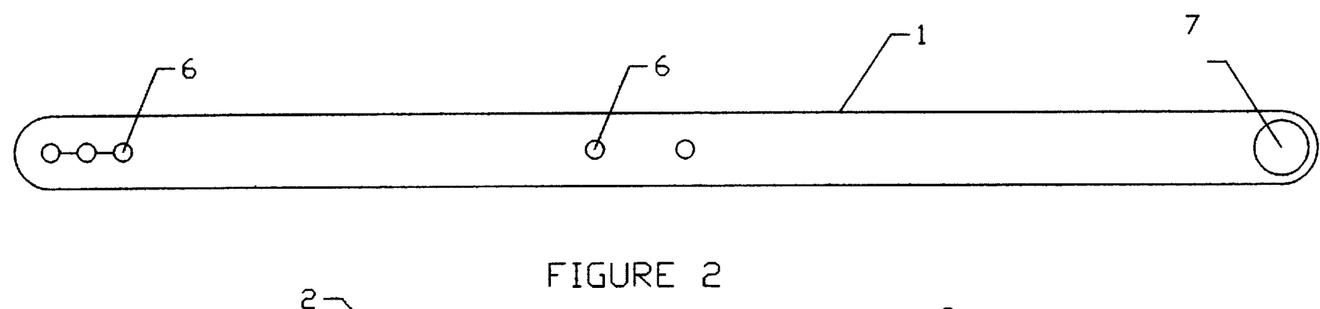
FIG. 2 is a side view of the bar faced on its inner side with protective material.

In its preferred embodiment the Vehicular wheel alignment tool is constructed of a single flat metallic bar 1 having an outer side and an inner side upon which a protective facing is affixed, and further having a lower section and a middle section with a plurality of small holes 6 accommodating insertion of J-hooks, and a upper section with a larger hole 7 to accommodate insertion of the T-handle.

Figure 3:
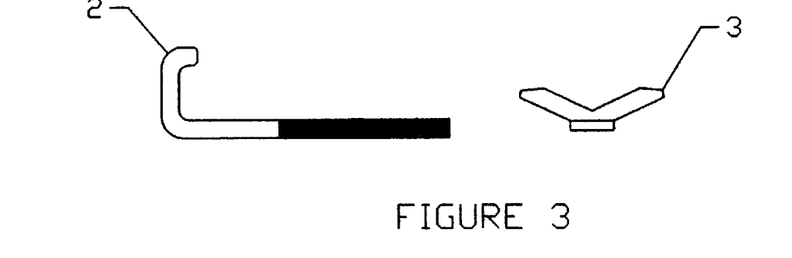
FIG. 3 is a side view of one of the two J-Hooks and connecting wing nuts.

A first J-hook 2 is inserted through the selected hole in the middle section of the bar and retained in place with a wing nut 3. A second J-hook 2 is inserted through the selected hole within the lower section as to accommodate the varying openings of the wheel and is held in place by a second wing nut 3. The selection of the hole within the middle section and the lower section of the bar is based upon the location of the openings of the wheel through which the J-hooks 2 will be inserted and held in place by tightening the corresponding wing nuts 3.

Figure 4:
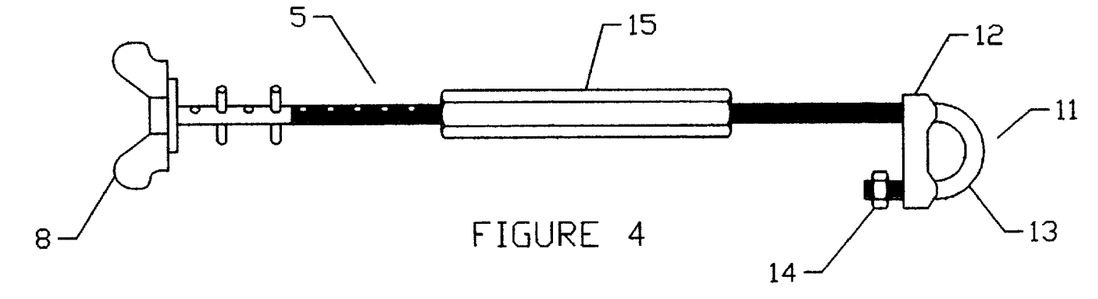
FIG. 4 is a side view of the top adjuster assembly comprised of the strut clamp, center union and handle.

The top adjuster assembly 5 is comprised of the handle section, two washers and holding pins, and a center union 15.

Figure 5:
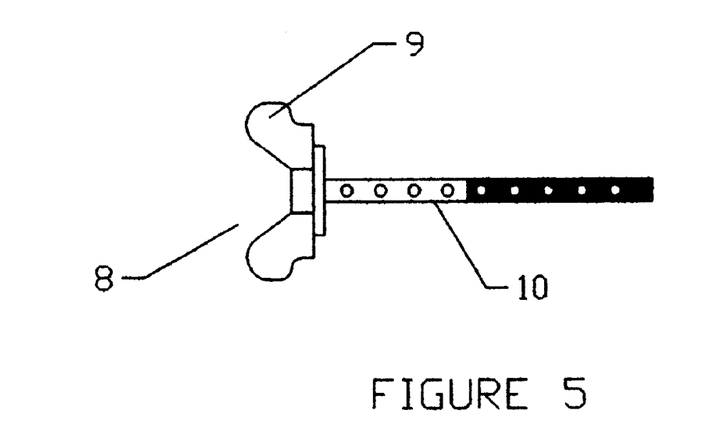
FIG. 5 is a profile of the T-handle containing a plurality of holes within its shaft.

The handle section 8 is comprised of a T-handle 9 affixed to the end of the outer portion of the elongated shaft 10. The elongated shaft has a plurality of holes in its outer portion, and an inner portion having an adjustable screw portion. The inner elongated shaft is inserted through the larger hole 7 within the upper section of the bar and is positioned with one of the plurality of the holes within the outer portion of the shaft 10 being located adjacent to the inner side of the bar 1 and another of the plurality of holes located adjacent to the outer side of the bar 1. The handle section 8 is retained in place within the bar 1 by use of two washers located adjacent to the inner and outer side of the bar and holding pins inserted through each of the holes found within the midsection of the handle shaft 10 which holes are positioned proximate to each side of the bar 1. The inner portion of the shaft 10 is threadably inserted in one end of the center union 15.

Figure 7:
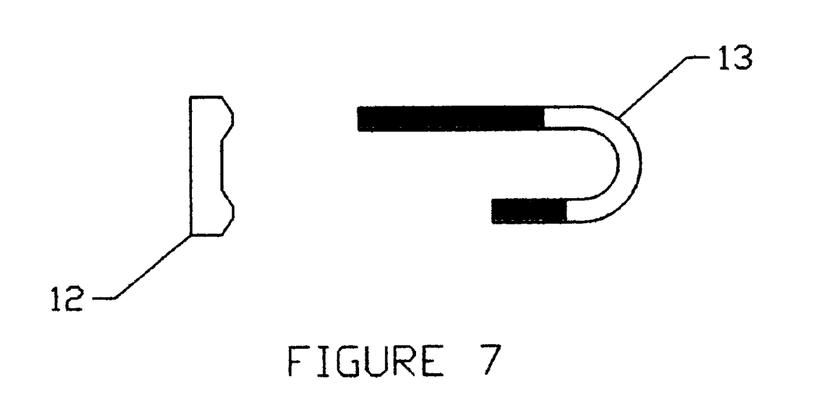
FIG. 7 is a profile of the spring clamp attachment having a modified U-bolt threaded on both ends with one end being shorter than the opposing end, a clamp and a retaining nut.

The spring clamp attachment 11 to the Vehicular wheel alignment tool in its preferred embodiment is comprised of a spring clamp utilizing a clamp 12, a nut 14, and a modified U-bolt 13 having an elongated end and an opposing end shorter than the elongated end. The modified U-bolt 13 is threaded on both ends.

Figure 8:
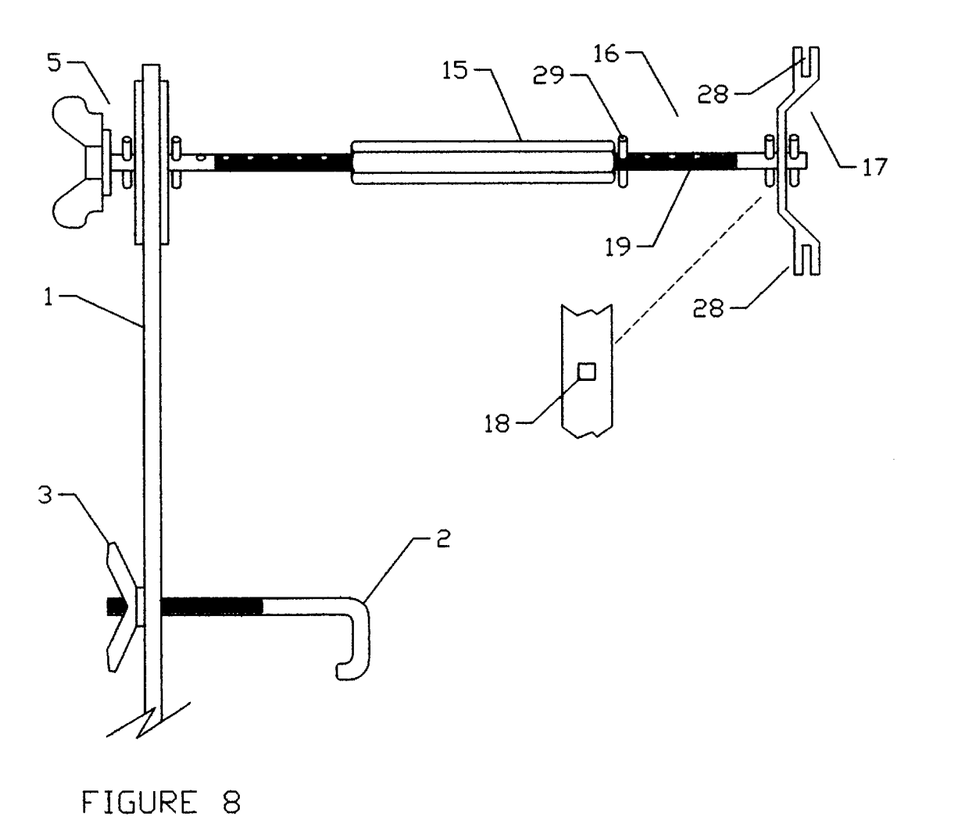
FIG. 8 is a side view illustrating the strut bridge attachment having a strut bridge with a wing tip at each end, a square hole to accommodate the threaded elongated adjuster rod, and a threaded elongated adjuster rod which on the one end is threadably affixed to and extends outwardly from the center union and on the other end is square shanked allowing for insertion into the square shanked hole within the center of the strut bridge.

The strut bridge attachment 16 of the Vehicular wheel alignment tool in its preferred embodiment is comprised of a flat metallic bar 17 shaped in a semi-hexagonal configuration having opposing extended wing tabs 28 horizontally stacked at each end. In the center of the strut bridge attachment is located a square shank hole 18 into which is inserted the end of the threaded, elongated square shanked adjuster rod 19. The elongated adjuster rod 19 has a plurality of holes in its outer portion to accommodate the insertion of a holding pin and is utilized to span the depth between the modified strut of the vehicle undergoing the alignment process and the top adjuster assembly as affixed to the wheel of said vehicle.

Figure 10:
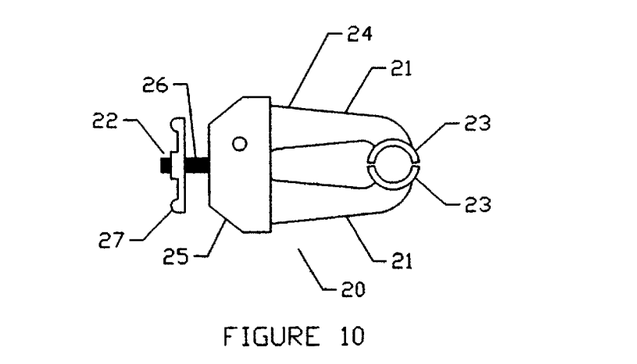
FIG. 10 is a top view of the Perry Clamp, an attachment consisting of two clamping arms having clamping tips at each end, said clamping arms off-set pivotly connected within a housing, said housing being threadably connected to an adjuster handle having an elongated threaded rod, with said rod threadably connected on the opposing end to the center union of the Vehicular wheel alignment tool.
Figure 11:
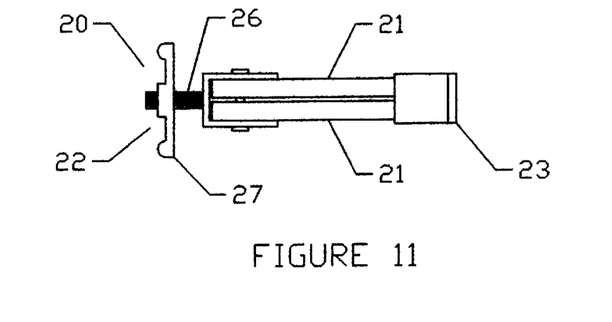
FIG. 11 is a side view of the Perry Clamp.

The Perry Clamp attachment 20 is a universal strut clamp mechanism available as one of three attachments for the Vehicular wheel alignment tool. The Perry Clamp attachment 20 is utilized on independent rear suspensions having an accessible modified strut assembly. The clamping arms 21 of the Perry Clamp attachment are fully adjustable to accommodate a variety of strut rod diameters. The adjuster handle 22 is used to open and close the clamping arms and is threadably connected to the center union 15 of the top adjuster assembly 5 so as to accommodate all varieties of accessible modified strut assemblies as are utilized on motor vehicles. The Perry Clamp attachment 20 in its preferred embodiment is comprised of two L-shaped horizontally extending clamping arms 21 with vertical clamping tips 23 in a U-shaped configuration which are utilized to fit around the exterior of the strut rod. Each clamping arm 21 is tapered down moving outwardly from its base 24. The base 24 is pivotly affixed to the Perry Clamp attachment housing 25 by way of a hole centrally positioned at its larger end. Moving outwardly from the base 24, there is an acute angle in the clamping arm 21 extending the tapering portion of each arm containing the clamping tip 23 at the end outwardly from the housing 25. The clamping tips 23 at the end of the clamping arms 21 are snugly secured around the strut rod by a camming action resulting from the threading of the housing 25 downwardly on the elongated threaded rod 26 resulting in said rod 26 pushing upwardly on the base 24 of each clamping arm 21 causing it to move in a pivotly outward direction pushing the clamping tip 23 on each opposed clamping arm 21 toward one another in a pincher type of action. The Perry Clamp attachment housing 25 is rectangular in shape with opposing pivot pin holes through which pins are inserted to individually capture the corresponding clamping arms 21. At the bottom of the housing 25 is located a threaded opening into which the elongated threaded rod 26 portion of the adjuster handle 22 will be inserted and adjusted in an upward direction coming into contact and pushing against the bottom of the clamping arms 21 forcing them in an upward direction resulting in the pivotal closure of the clamping tips 23 located on the opposing clamping arms 21. The top portion of the housing 25 remains open to accommodate free movement of the clamping arms 21 about their respective pivot pins. The adjuster handle 22 consists of a T-handle 27 fixed around the outer portion of an elongated threaded rod 26, which is threadably connected to the center union 15 of the top adjuster assembly 5, which is used to adjust the span distance between the strut and the wheel.

Figure 6:
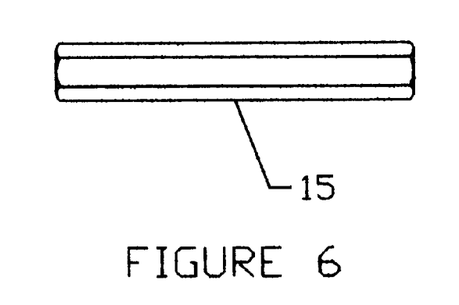
FIG. 6 is a side view showing the center union containing an elongated hexagonal tube which is threaded internally to allow the extension and retraction of the T-handle so as to accommodate the varying depths of location of the strut assembly from the wheel. It also serves as a connection device between the T-handle assembly and all three clamp assemblies.

The center union 15 in its preferred embodiment is an elongated hexagonal tube, containing a threaded opening running throughout the center of its entire length, and having an outer end into which is threadably inserted the inner portion of the shaft 10 of the handle section 8 and an outer end into which is threadably inserted the elongated end of the modified U-bolt 13 of the spring clamp attachment 11, or the elongated adjuster rod 19 of the strut bridge attachment 16, or the elongated threaded rod 26 Perry Clamp attachment 20.

Figure 1:
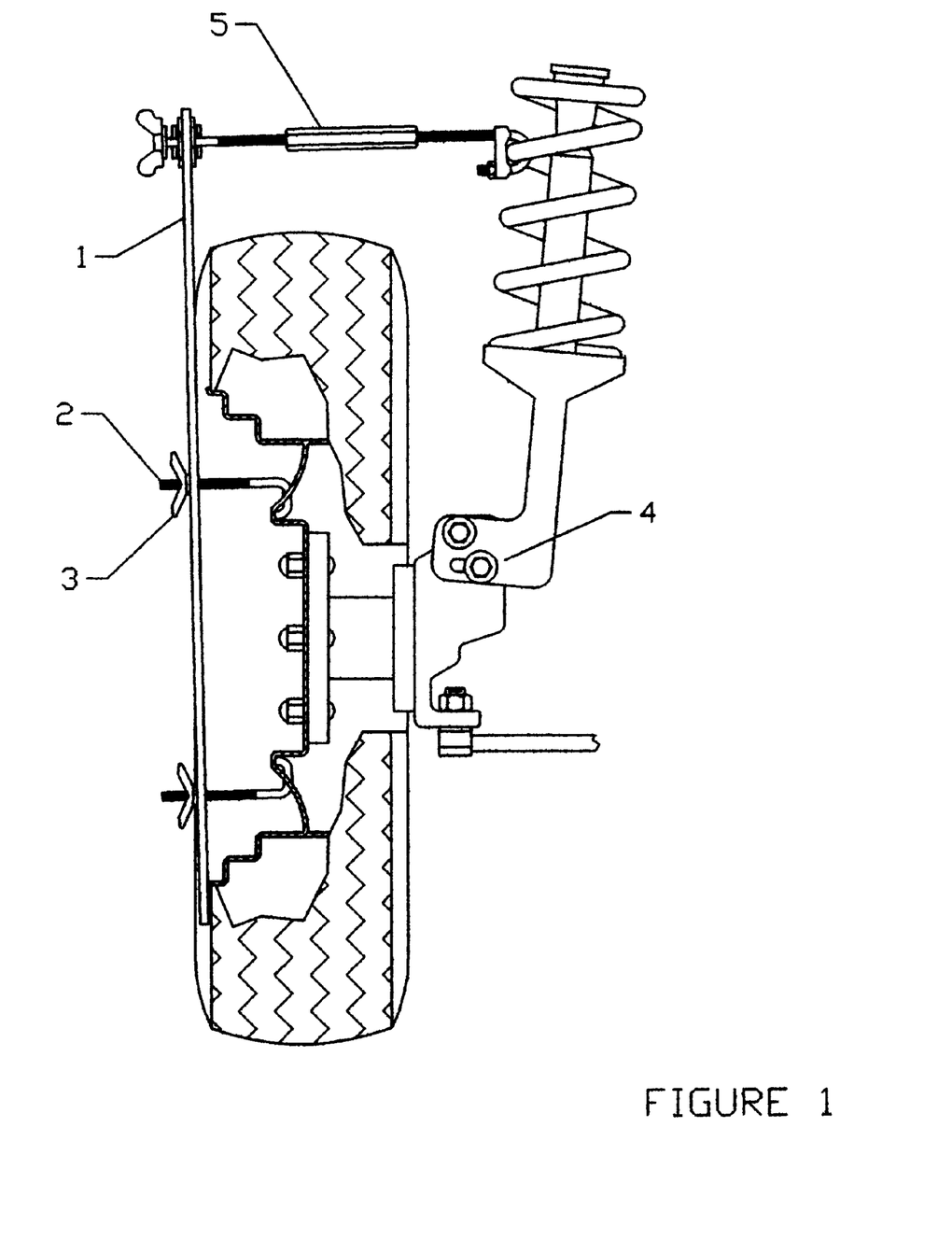
FIG. 1 is a perspective view illustrating the Vehicular wheel alignment tool in use with the strut clamp attachment, said Vehicular wheel alignment tool affixed to a wheel mounted on a combination strut and spring assembly.

In using the handle section 8 of the shaft 10 of the top adjuster assembly 5, a washer is first placed on the shaft 10 and positioned near the T-handle 9, the shaft 10 is then inserted into the larger hole 7 located in the upper section of the bar 1, and a second washer is placed over the shaft and positioned near the inside of the bar 1. With the two washers positioned on adjacent corresponding sides of the bar, two holding pins are inserted into the holes located on the shaft 10, adjacent to the outermost sides of the corresponding washer. The bar 1 is then slidably positioned between any two of the plurality of holes located on the shaft 10 of the handle section 8. The choice of the holes is determined by the mechanic based upon the distance to be spanned from the bar 1 as affixed to the wheel and the spring of the combination strut so as to place and retain the bar 1 in a vertical position. In utilizing the spring clamp attachment 11, after the J-hooks 2 placed through the lower and middle sections of the bar 1 are securably positioned through the wheel undergoing the alignment process, the clamp 12 is pivoted so as to expose the interior opening of the modified U-bolt 13 which is placed over the coil spring on the strut, the clamp 12 is pivoted closed and inserted over the shortest end of the modified U-bolt 13, and the nut 14 is threadably connected to secure the clamp 12 firmly against the coil spring (FIG. 1).

Figure 9A:
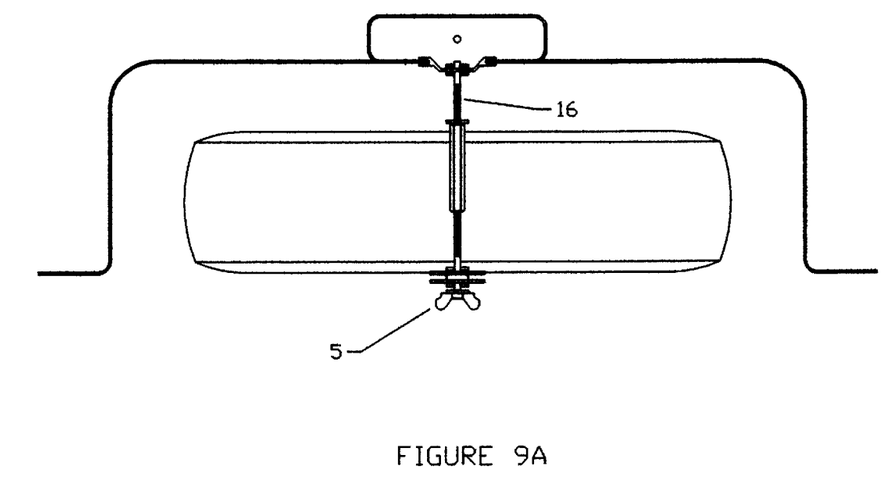
FIG. 9A is an overhead view and FIG. 9B is a perspective view of the vehicular wheel alignment tool with the strut bridge attachment, said Vehicular wheel alignment tool affixed to a wheel mounted on an independent suspension equipped with non-accessible modified two bolt slotted struts.
Figure 9B:
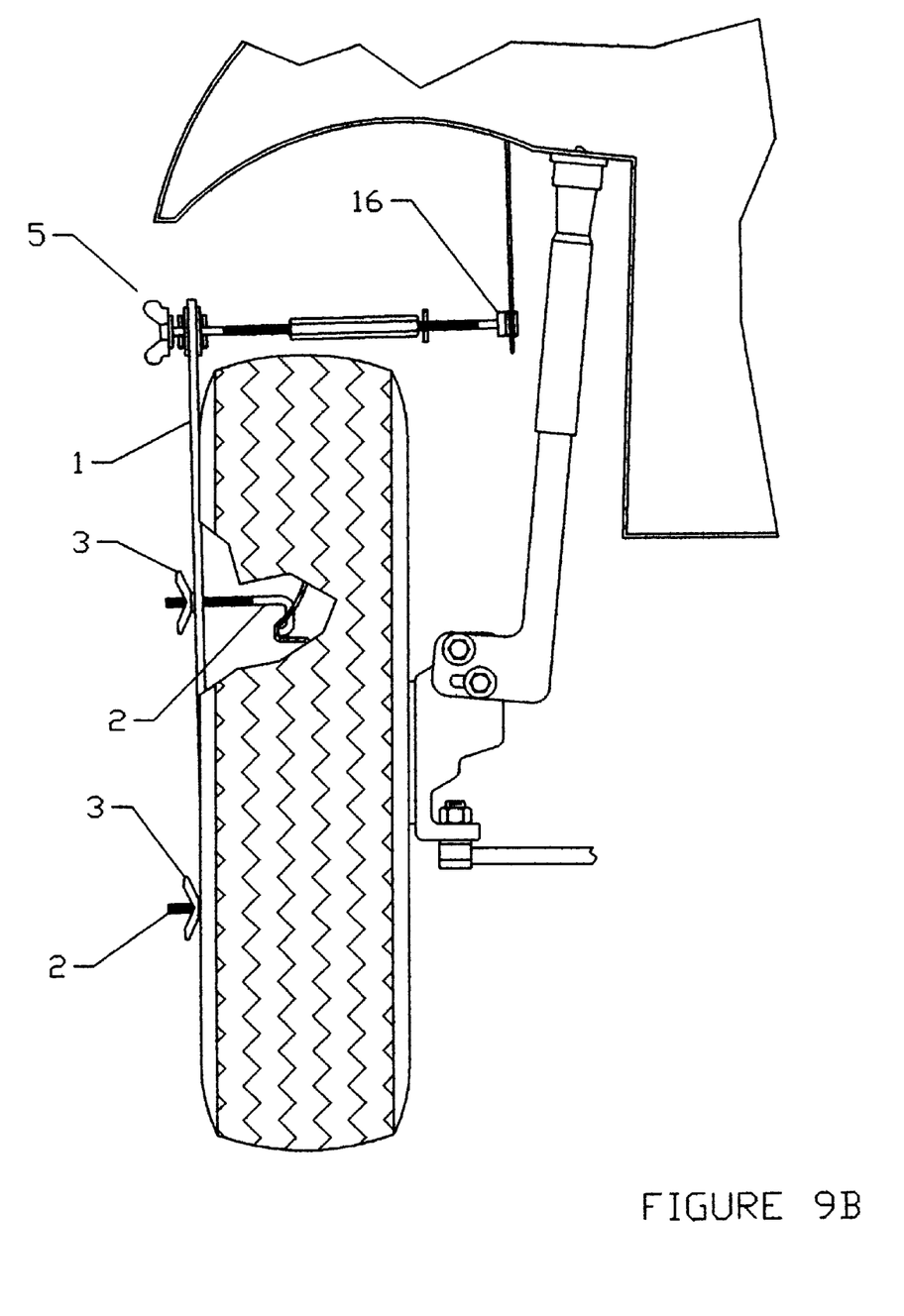

In using the strut bridge attachment 16, remove the spring clamp attachment 11 from the top adjuster assembly 5 and install the bar 1 of the vehicular wheel alignment tool to the wheel of the vehicle undergoing the alignment procedure. Thereafter, slide the wing tabs 28 over the inner body pinch welds located in the center of the rear wheel strut tower cavity (FIGS. 9A and 9B). The strut bridge attachment 16 is then centered so that the adjuster rod is horizontal to the center union of the top adjuster assembly. A holding pin 29 is then inserted into the selected hole in the strut bridge assembly adjuster rod 19 selected by the mechanic based upon the depth to be spanned from the center union 15 by the strut bridge assembly adjuster rod 19. The center union 15 is thereafter threaded onto the strut bridge assembly adjuster rod 19 coming to rest against the holding pin 29. At the completion of this installation process, the Vehicular wheel alignment tool is ready to use in the alignment procedure for a vehicle having independent rear suspension with a non-accessible modified strut.

Figure 12:
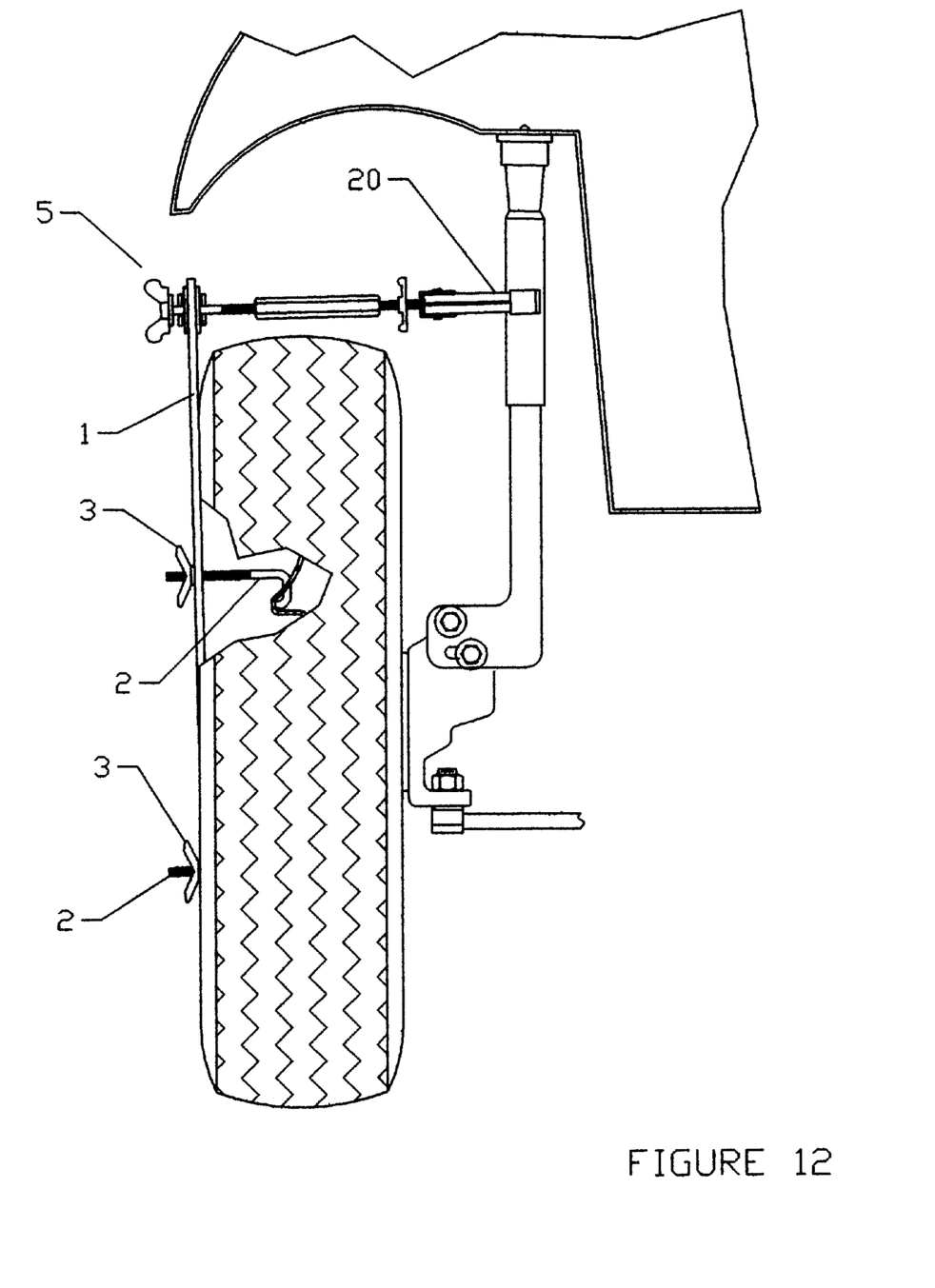
FIG. 12 is a perspective view of the Vehicular wheel alignment tool with the Perry Clamp attachment, said Vehicular wheel alignment tool affixed to a wheel mounted on an independent suspension equipped with accessible modified two bolt slotted struts.

Use of the Perry Clamp attachment 20 is accomplished by the removal of the spring clamp attachment 11 and installation of the bar 1 to the wheel of the vehicle undergoing the alignment procedure. The clamping arms 21 are opened and the clamping tips 23 are placed on the strut rod. Thereafter, the clamping arms 21 are secured in place by rotating the T-handle 27 in a clockwise fashion until a snug fit is achieved. Following this, the center union 15 of the top adjuster assembly 5 is threadably connected to the adjuster handle 22 of the Perry Clamp attachment 20, drawing the center union 15 into contact with the T-handle 27. With the installation process now complete (FIG. 12), the Vehicular wheel alignment tool is ready to use in the alignment procedure for a vehicle having an independent rear suspension with accessible modified struts.

Once affixed to the wheel and strut, the upper and lower camber bolts are loosened. Thereafter, the T-handle 9 of the top adjuster assembly 5 is rotated thereby allowing the wheel to pivotly move around the axis of the upper camber bolt. The T-handle 9 of the top adjuster 5 is rotated in the appropriate direction to move the wheel to the desired camber setting. Once the desired camber setting is attained, the vehicular wheel alignment tool operates to securely retain the wheel at the appropriate camber setting while the mechanic tightens the upper and lower camber bolts. This same procedure is then repeated on the opposing wheel to complete the alignment procedure.

I claim:

1. A vehicular wheel alignment tool for connection to the wheel of a motor vehicle so as to aid in the adjustment of the camber of the wheel undergoing alignment, said tool comprising:
   a. a wheel connecting assembly having a plurality of connectors threaded J-hooks and corresponding wing nuts for connecting the tool to the vehicle wheel;
   b. a strut connecting assembly having a T-handle section, a clamp section, and a center union section connecting the T-handle section and the clamp section;
   c. a bar with two sides and having an upper section, midsection and lower section, the lower section and midsection also forming part of the wheel connecting assembly and the upper section being combined with the strut connecting assembly;
   d. the bar has two sides, the one side of the bar is faced with a protective coating and the opposing side of the bar is unfaced.

2. The vehicular wheel alignment tool of claim 1 wherein the bar has a plurality of holes contained within its upper section, midsection and lower section for purposes of connecting said wheel connecting assembly to the wheel of the vehicle and for retaining said strut connecting assembly in position.

3. The vehicular wheel alignment tool of claim 2 wherein the connectors of the wheel connecting assembly include a first and a second J-hook, each J-hook having a hook end and a straight end, the straight end of the first J-hook passing through one of the plurality of holes in the midsection of the bar with the straight end of the second J-hook passing through one of the plurality of holes in the tail section of said bar, each J-hook having a means to tightly secure the bar to the wheel undergoing the alignment procedure.

4. The vehicular wheel alignment tool of claim 3 wherein the straight end of each J-hook is threaded and the means to tightly secure the bar to the wheel includes wing nuts, a wing nut being threadably received on each J-hook.

5. The vehicular wheel alignment tool of claim 3 wherein the hook end of the first and second J-hooks are covered with a protective material to prevent damage to the paint or other surface of the wheel when connected.

6. The vehicular wheel alignment tool of claim 1 wherein the bar is made of sufficiently stiff material so as not to appreciably bend or otherwise alter in configuration when used in the wheel alignment process.

7. The vehicular wheel alignment tool of claim 1 wherein the strut connecting assembly is adjustable in length to accommodate variations in various vehicular wheel dimensions and vehicular strut locations in relation to said vehicular wheel.

8. The vehicular wheel alignment tool of claim 1 in which the center union section is internally threaded to receive and allow adjustment of the handle section and the clamp section of the tool.

9. A vehicle wheel alignment tool for use in adjusting camber of a wheel on a vehicle, comprising:
   a vertically disposed member selectively attachable to the wheel,
   the vertically disposed member having an upper end,
   an elongate link member retainable to said upper end and disposed over said wheel,
   said elongate link member having engagement means mounted to a handle member,
   said engagement means selectively attachable to said vehicle,
   said elongate link member being selectably adjustable in length,
   said handle member axially rotatable upon said vertically disposed member,
   means to prevent axial movement of said elongate link member upon said vertically disposed member.

10. The vehicle wheel alignment tool of claim 9 wherein said engagement means comprises a U-shaped hook element and a locking bar,
    said locking bar selectively operable with said hook element to lock said vehicle to said hook member.

11. The vehicle wheel alignment tool of claim 9 wherein said engagement means comprises a rod retained to a transverse bridge member,
    said bridge member has diametrically opposing ends,
    each of said ends includes a pair of spaced apart fingers.

12. The vehicle wheel alignment tool of claim 9 wherein said engagement means comprises a selectively operable clamp which has horizontally movable jaws,
    said jaws each having concave ends,
    said concave ends disposed in facing opposition.

13. The vehicle wheel alignment tool of claim 9 wherein said elongate link member having a handle member freely rotatable upon said upper end of said vertically disposed member and axially immoveable thereupon,
    said elongate link member includes a joining element interconnecting said handle member and said engagement means.

14. A vehicular wheel alignment tool for connection to the wheel of a motor vehicle so as to aid in the adjustment of the camber of the wheel undergoing alignment, said tool comprising:
    a. a wheel connecting assembly having a plurality of connectors threaded J-hooks and corresponding wing nuts for connecting the tool to the vehicle wheel;

b. a strut connecting assembly having a T-handle section, a clamp section, and a center union section connecting the T-handle section and the clamp section;

c. a bar with two sides and having an upper section, midsection and lower section, the lower section and midsection also forming part of the wheel connecting assembly and the upper section being combined with the strut connecting assembly;

d. the T-handle section is comprised of a T-handle attached to a threaded shaft containing a plurality of holes and having a plurality of holding pins and washers; the upper section of the bar having a hole and said threaded shaft passing through said hole and being held within said hole by washers positioned on each side of the bar, said washers retained by holding pins passing through one of the holes that is located in the threaded shaft nearest each said washer thereby providing for different positioning of the T-handle section in relation to the bar to accommodate a variety of dimensional differences of vehicular wheels, and further providing for the retention of the T-handle section in place within the bar while being turned to push the strut assembly away from the bar thereby increasing the camber angle or draw the strut nearer to the bar thereby decreasing the camber angle.

15. A vehicular wheel alignment tool for connection to the wheel of a motor vehicle so as to aid in the adjustment of the camber of the wheel undergoing alignment, said tool comprising:

a. a wheel connecting assembly having a plurality of connectors threaded J-hooks and corresponding wing nuts for connecting the tool to the vehicle wheel;

b. a strut connecting assembly having a T-handle section, a clamp section, and a center union section connecting the T-handle section and the clamp section;

c. a bar with two sides and having an upper section, midsection and lower section, the lower section and midsection also forming part of the wheel connecting assembly and the upper section being combined with the strut connecting assembly;

d. the clamp section of the strut connecting assembly is a spring clamp attachment which includes a modified U-bolt having first and second opposing threaded ends with the second end being shorter in length than the first end, and a clamp and a retaining nut, said clamp section being for use in the alignment of wheels mounted on a combination strut/spring suspension.

16. A vehicular wheel alignment tool for connection to the wheel of a motor vehicle so as to aid in the adjustment of the camber of the wheel undergoing alignment, said tool comprising:

a. a wheel connecting assembly having a plurality of connectors threaded J-hooks and corresponding wing nuts for connecting the tool to the vehicle wheel;

b. a strut connecting assembly having a T-handle section, a clamp section, and a center union section connecting the T-handle section and the clamp section;

c. a bar with two sides and having an upper section, midsection and lower section, the lower section and midsection also forming part of the wheel connecting assembly and the upper section being combined with the strut connecting assembly;

d. the clamp section of the strut connecting assembly consists of a strut bridge having a center section and two opposing ends with a wing tip at each end; a square opening in the center section; a threaded elongated adjuster rod having two ends with the first end being threaded and the second end consisting of a threaded square shank; and a retaining nut; said clamp section being for use in the alignment of wheels mounted on independent suspension equipped with non-accessible modified two bolt slotted struts.

17. A vehicular wheel alignment tool for connection to the wheel of a motor vehicle so as to aid in the adjustment of the camber of the wheel undergoing alignment, said tool comprising:

a. a wheel connecting assembly having a plurality of connectors threaded J-hooks and corresponding wing nuts for connecting the tool to the vehicle wheel;

b. a strut connecting assembly having a T-handle section, a clamp section, and a center union section connecting the T-handle section and the clamp section;

c. a bar with two sides and having an upper section, midsection and lower section, the lower section and midsection also forming part of the wheel connecting assembly and the upper section being combined with the strut connecting assembly;

d. the clamp section of the strut connecting assembly includes a Perry clamp for use in the alignment of wheels mounted on an independent suspension equipped with accessible modified two bolt slotted struts, said Perry clamp having a first and a second clamping arm with a top end and a bottom end, each said clamping arm having a clamping tip at its top end with a center opening at its bottom end; a first retaining pivot pin received in said center opening; a housing with two elongated sides and a base section, each elongated side having a pivot pin opening, and the base section having a threaded opening; second retaining pivot pins received in the openings in the sides of the elongated base and the bottom ends of the clamping arms so as to pivotly retain the clamping arms within the housing; and a threaded elongated handle rod received in the threaded opening in the base section of the housing.

18. A vehicle wheel alignment tool for use in adjusting camber of a wheel on a vehicle, comprising;

a vertically disposed member selectively attachable to the wheel, the vertically disposed member having an upper end, an elongate link member retainable to said upper end and disposed over said wheel, said elongate link member having engagement means mounted to said handle member, said engagement means selectively attachable to said vehicle, said elongate link member being selectably adjustable in length, said elongate link member having a handle member freely rotatable upon said upper end of said vertically disposed member and axially immoveable thereupon, said handle member is provided with an elongate rod axially rotatable relative to said engagement means, said vertically disposed member is provided with an opening through the upper end thereof, said rod of said handle member is receivable in said opening of said upper end, said rod is provided with a plurality of diametric openings therethrough along its length, a pair of pins is selectively receivable within adjacent pairs of said openings, said pins are disposed on opposing sides of said vertically disposed member.

19. A vehicle wheel alignment tool for use in adjusting camber of a wheel on a vehicle, comprising;

a vertically disposed member selectively attachable to the wheel, the vertically disposed member having an upper end, an elongate link member retainable to said upper end and disposed over said wheel, said elongate link member having engagement means mounted to said handle member, said engagement means selectively attachable to said vehicle, said elongate link member being selectably adjustable in length, said elongate link member having a handle member freely rotatable upon said upper end of said vertically disposed member and axially immoveable thereupon, said elongate link member includes a joining element interconnecting said handle member and said engagement means, said handle member is provided with a rod axially rotatable relative to said engagement means, said vertically disposed member is provided with an opening through the upper end thereof, said rod of said handle member is receivable in said opening of said upper end, said rod is provided with a plurality of diametric openings therethrough along its length, a pair of pins is selectively receivable within adjacent pairs of said openings, said pins are disposed on opposing sides of said vertically disposed member.

\* \* \* \* \*